United States Patent [19]
Aneshansley

[11] 3,771,148

[45] Nov. 6, 1973

[54] NONVOLATILE CAPACITIVE MEMORY CELL

[75] Inventor: Nicholas E. Aneshansley, Centerville, Ohio

[73] Assignee: The National Cash Register Company, Dayton, Ohio

[22] Filed: Mar. 31, 1972

[21] Appl. No.: 240,259

[52] U.S. Cl.340/173 R, 340/173 CA, 340/173 DR, 340/173 FF, 307/238, 307/279

[51] Int. Cl. .......... G11c 11/40

[58] Field of Search .......... 340/173 R, 173 CA, 340/173 FF, 173 DR

[56] References Cited

UNITED STATES PATENTS

| | | | |
|---|---|---|---|
| 3,387,286 | 6/1968 | Dennard | 340/173 R |
| 3,576,571 | 4/1971 | Booker | 340/173 R |
| 3,631,408 | 12/1971 | Kubo | 340/173 CA |
| 3,518,635 | 6/1970 | Cole et al. | 307/238 |
| 3,593,037 | 7/1971 | Hoff | 307/238 |

*Primary Examiner*—Terrell W. Fears
*Attorney*—J. T. Cavender et al.

[57] ABSTRACT

The present invention relates to a nonvolatile capacitive memory cell, which has a capacitive means and a nonvolatile alterable threshold field effect transistor therein. The nonvolatile alterable threshold field effect transistor is used to capacitively store information in said capacitive means while power is applied to the nonvolatile capacitive memory cell. The nonvolatile alterable threshold field effect transistor is also used to nonvolatilely store a binary bit of information which is capacitively stored within the capacitive means, when power is lost to the nonvolatile capacitive memory cell. A pulse from a storage driver connected to the gate electrode of the nonvolatile alterable threshold field effect transistor causes the nonvolatile storage of said binary bit of information. When a binary one bit of information is capacitively stored in the volatile capacitive means, and power is lost, the threshold voltage of the nonvolatile alterable threshold field effect transistor will not be changed, representing the nonvolatile storage of a one bit by said transistor. When a binary zero bit of information is capacitively stored in the volatile capacitive means and power is lost, the threshold voltage of the nonvolatile alterable threshold field effect transistor will be changed, representing the nonvolatile storage of a zero bit by said transistor. A write data circuit is connected to the source electrode of the nonvolatile alterable threshold field effect transistor to capacitively store a binary bit of information into the capacitive means. A preset circuit and a storage circuit are used in nonvolatilely storing the one or zero bit of binary information of the capacitive means into the nonvolatile alterable threshold field effect transistor as power is lost to the nonvolatile capacitive memory cell.

12 Claims, 7 Drawing Figures

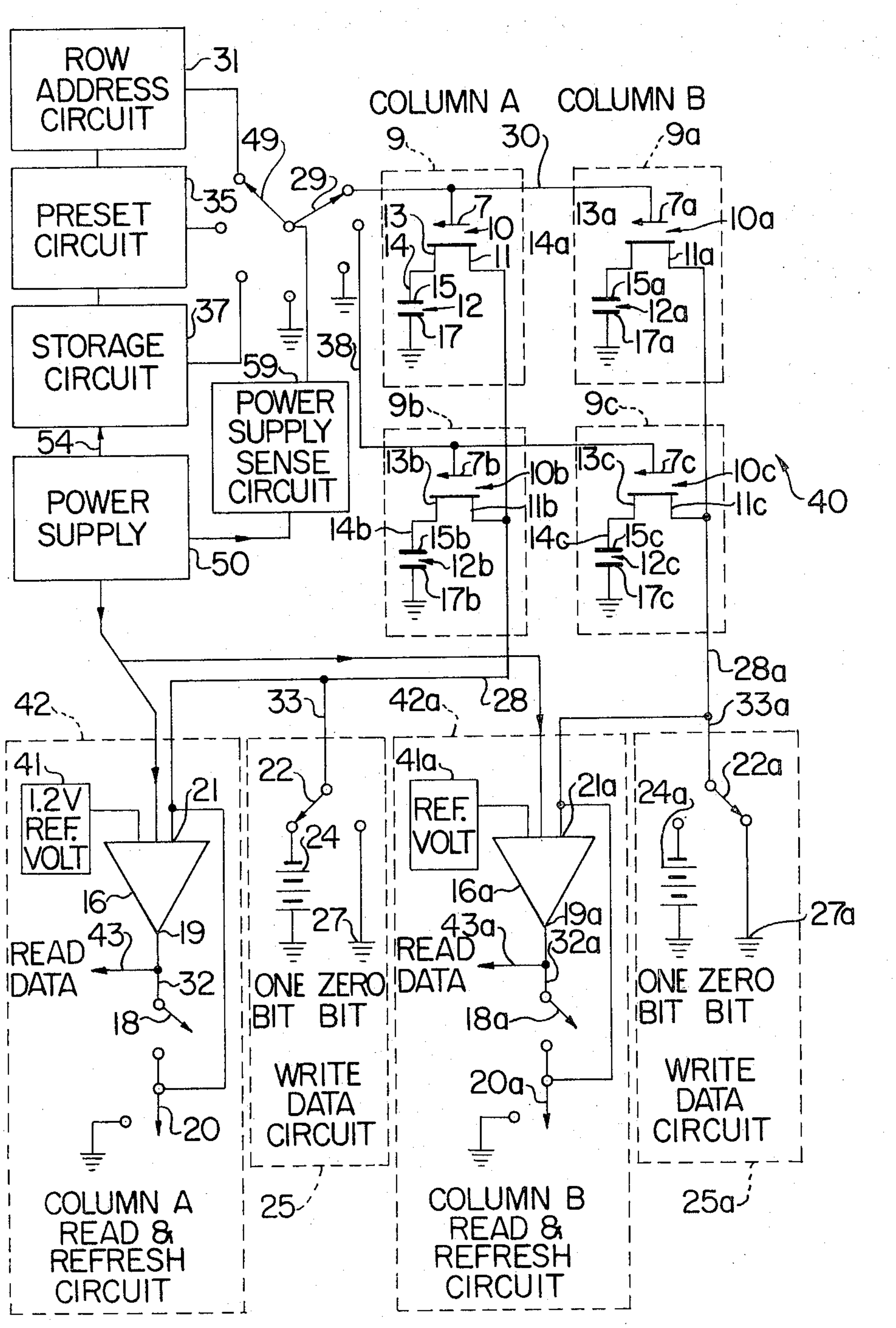
FIG. I

NONVOLATILE CAPACITIVE MEMORY CELL

BACKGROUND OF THE INVENTION:

R. H. Dennard, in the U.S. Pat. No. 3,387,286, entitled "Field Effect Transistor Memory," discloses a volatile capacitive memory cell. The volatile capacitive memory cell has a capacitive means and a volatile fixed threshold field effect transistor therein. The volatile fixed threshold field effect transistor is used to address the capacitive means. The volatile capacitive memory cell will volatilely hold binary information therein while power is applied thereto. However all information is lost from the volatile capacitive memory cell when power is lost therefrom.

The present invention relates to a nonvolatile capacitive memory cell which does not lose its information as power is lost therefrom. The nonvolatile capacitive memory cell circuit includes a capacitive means connected to the drain electrode of nonvolatile alterable threshold field effect transistor. The nonvolatile alterable threshold field effect transistor addresses the capacitive means when power is applied thereto. A binary zero bit of information which is capacitively stored in the capacitive means is nonvolatilely stored into the nonvolatile alterable threshold field effect transistor thereof, as a negative increase in its threshold voltage, when power is removed from the nonvolatile capacitive memory cell. A pulse from a storage circuit is applied to the gate electrode of the nonvolatile alterable threshold field effect transistor to nonvolatilely store the zero bit. When a binary one bit is capacitively stored in the capacitive means, there is no change in the threshold voltage of the nonvolatile alterable threshold field effect transistor as power is lost to the nonvolatile capacitive memory cell. The nonvolatilely stored information will remain in the nonvolatile alterable threshold field effect transistor for many months without power being applied thereto.

The present applicant uses a nonvolatile alterable threshold field effect transistor, a capacitive means and a storage driver in order to form a nonvolatile capacitive memory cell circuit. It is not obvious from Dennard that a capacitive means can be used with a nonvolatile alterable threshold field effect transistor and a storage driver to form a nonvolatile capacitive memory cell circuit which will nonvolatilely store capacitively stored binary information as power is removed from said nonvolatile capacitive memory cell circuit.

The nonvolatile capacitive memory cell circuit uses channel shielding through the drain electrode of the nonvolatile alterable threshold field effect transistor by the capacitive means to transfer information from the capacitive means to the nonvolatile alterable threshold field effect transistor during a power loss. The use of channel shielding to transfer binary information from a capacitive means into a nonvolatile alterable threshold field effect transistor during a power loss is not suggested by Dennard.

The channel shielding writing technique is described in U.S. Pat. No. 3,618,051 by R. E. Oleksiak, issued Nov. 2, 1971.

A similar nonvolatile memory cell is disclosed in U.S. patent application Ser. No. 86,190 filed Nov. 2, 1970, by G. C. Lockwood, and assigned to the present assignee. A bistable terminal is used to provide channel shielding of an alterable threshold field effect transistor during the loss of power to the nonvolatile memory cell of Lockwood.

SUMMARY OF THE INVENTION

The present invention relates to a nonvolatile capacitive memory cell for storing information therein comprising a signal translating means capable of storing a charge in a nonvolatile manner, and having source and drain electrodes and a control electrode; capacitive means for capacitively storing a charge therein including two conductive elements and a dielectric element therebetween; and connecting means connecting the drain electrode of the signal translating device to one of the conductive elements of the capacitive means.

An object of the present invention is to provide a nonvolatile capacitive memory cell which can nonvolatilely store volatile binary information within a capacitive means into an alterable threshold field effect transistor when power is lost from the nonvolatile capacitive memory cell.

Another object of the present invention is to provide means to transfer binary information, which is nonvolatilely stored within an alterable threshold field effect transistor of a nonvolatile capacitive memory cell, back into a capacitive means of a nonvolatile capacitive memory cell.

DESCRIPTION OF THE DRAWINGS

FIG. 1 is a circuit diagram for a nonvolatile capacitive memory cell circuit comprising a volatile dielectric capacitor and an alterable threshold field effect transistor.

DESCRIPTION OF THE PREFERRED EMBODIMENT

Figure 2A:
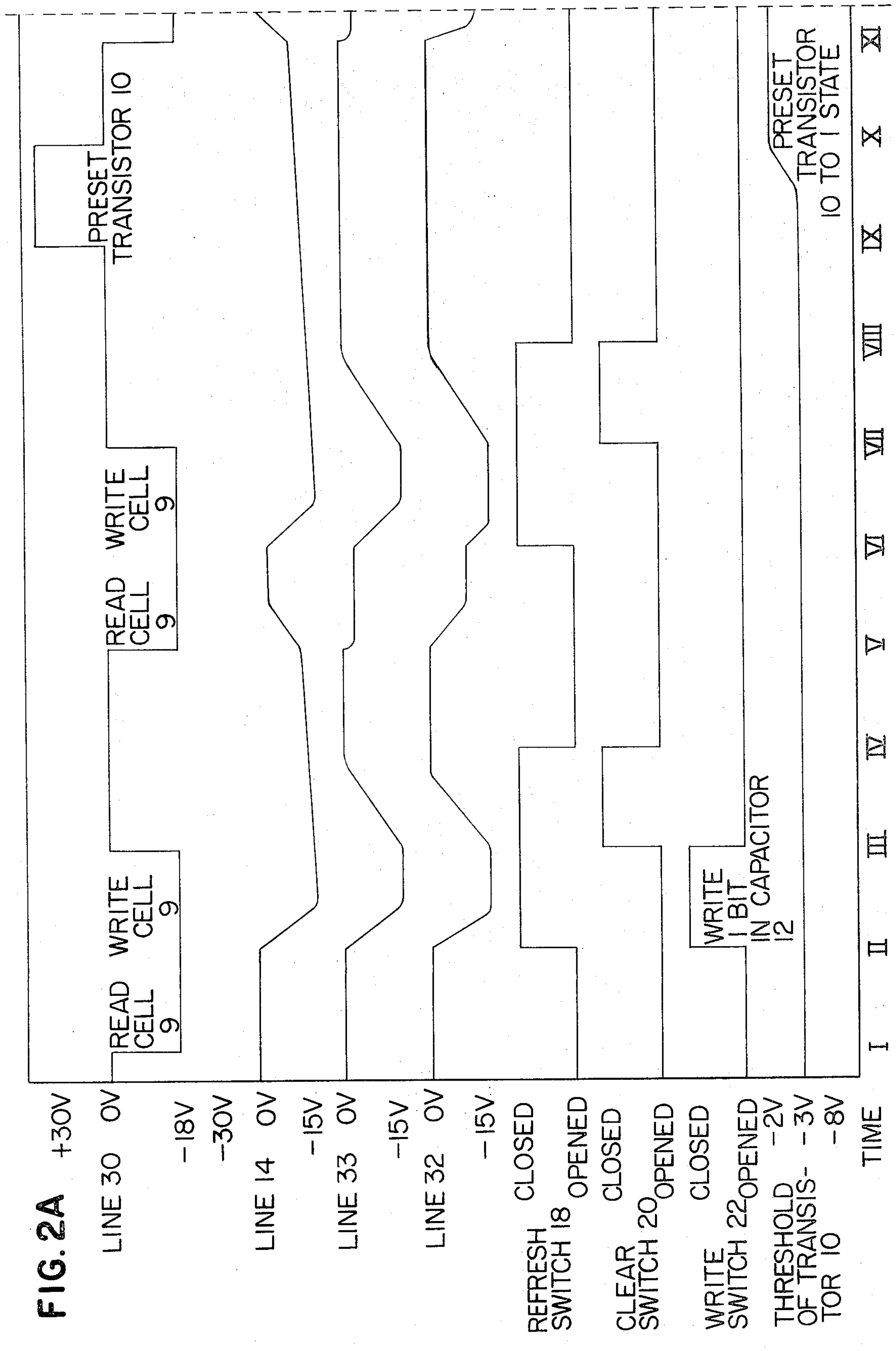
FIGS. 2A and 2B taken together constitute a timing diagram for the operation of the nonvolatile capacitive memory cell circuit of FIG. 1.

FIG. 1 shows an array 40 of nonvolatile capacitive memory cells 9 through **9*c*. Each nonvolatile capacitive memory cell 9, 9*a*, 9*b*, and 9*c* respectively has a nonvolatile alterable threshold field effect transistor 10, 10*a*, 10*b* or 10*c*, such as an alterable threshold metal-aluminum oxide-silicon oxide-silicon (MAOS) field effect transistor or metal-silicon nitride-silicon oxide-silicon (MNOS) field effect transistor, therein. Each nonvolatile capacitive memory cell 9, 9*a*, 9*b* and 9*c* also respectively has a capacitive means such as a dielectric capacitor 12, 12*a*, 12*b*** or *c* therein. A first conductive material or metal plate 15 of the volatile dielectric capacitor 12 is connected by a lead 14 to the drain electrode 13 of the nonvolatile alterable threshold field effect transistor 10 to form the nonvolatile capacitive memory cell 9. The nonvolatile alterable threshold field transistor 10 may be a discrete metal-silicon nitride-silicon oxide-semiconductor (MNOS) alterable threshold transistor. The volatile dielectric capacitor 12 may be a discrete dielectric capacitor. Alternatively the volatile capacitive means may be the gate to substrate capacitance of a fixed threshold metal-silicon oxide-silicon (MOS) field effect transistor. The dielectric capacitor 12 has a second conductive material or metal plate 17, which is held at ground potential. The conductive material may be the silicon substrate of an MOS field effect transistor. The gate electrode 7 of the nonvolatile alterable threshold MNOS field effect transistor 10 is connectable to row address circuit 31 by switches 49 and 29. The source electrode 11 of the alterable threshold MNOS field effect transistor 10 is connectable to column A read and refresh circuit 42 or to write data circuit 25.

Figure 3:
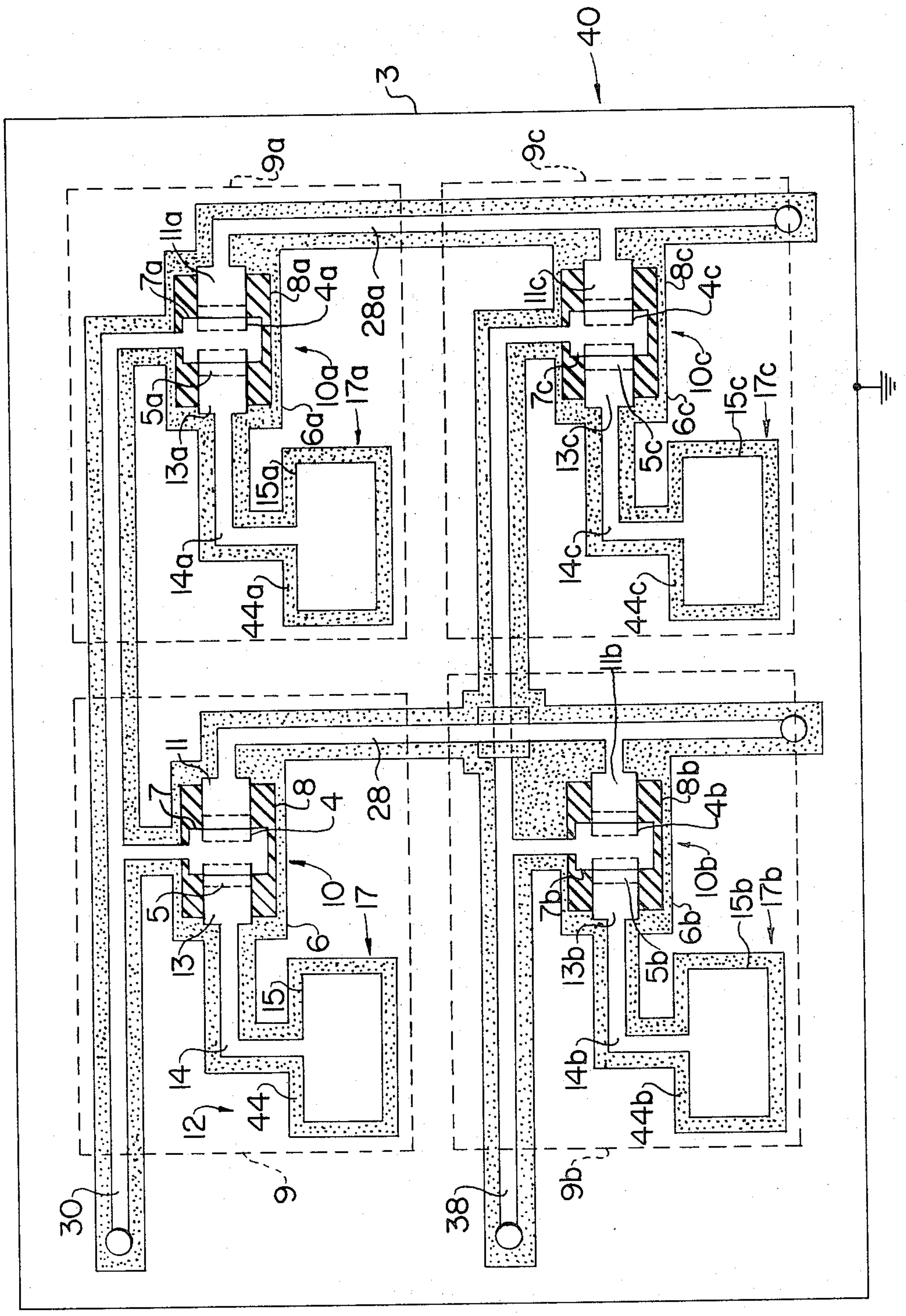
FIG. 3 is a plan view of an integrated array of nonvolatile capacitive memory cells.

FIG. 3 shows an integrated array 40 of nonvolatile capacitive memory cells 9, 9*a*, 9*b* and 9*c*. To form MNOS transistor 10 of nonvolatile capacitive memory cell 9, p-type source and drain regions 4 and 5 are diffused into silicon wafer 3. In the region between p-type source and drain regions 4 and 5 of the MNOS field effect transistor 10 is deposited an approximate 50 angstrom thick silicon oxide insulator layer 6, above which is deposited an approximately 1,000 angstrom thick silicon nitride insulator layer 8. A gate electrode 7, such as an aluminum gate electrode, is deposited in contact on the 1,000 angstrom silicon nitride insulator layer 8. A source electrode 11 is connected to the p-type source region 4 of the MNOS field effect transistor 10. A drain electrode 13, which may be of aluminum, is connected to the drain region 5 of the MNOS field effect transistor 10.

To form the nonvolatile capacitive memory cell 9, nonvolatile alterable threshold MNOS field effect transistor 10 is placed in contact with metal plate 15 of volatile dielectric capacitor 12 through lead 14 of FIG. 3. The metal plate 15 may be a 10,000 angstrom thick aluminum film. The metal plate 15 lies in contact with a 1,000 angstrom thick silicon oxide insulator layer 44. The second metal plate 17 of the dielectric capacitor 12 is the substrate of the n-type silicon wafer 3 in which the dielectric capacitor 12 and the nonvolatile alterable threshold MNOS field effect transistor 10 are built. The silicon wafer 3 is grounded. Nonvolatile capacitive memory cells 9*a*, 9*b* and 9*c* are identical to the nonvolatile capacitive memory cell 9. The capacitive means of nonvolatile capacitive memory cell 9 may be the gate-to-substrate capacitance of an MOS field effect transistor or other field effect transistor. The construction of an alterable threshold field effect transistor is disclosed in U.S. Pat. No. 3,647,535 issued Mar. 7, 1972 by C. T. Nabor and assigned to the present assignee.

As shown in FIG. 1, the source electrode 11 and 11*b* of the alterable threshold MNOS field effect transistors 10 and 10*b* are connected to a high gain noninverting differential amplifier 16 via line 28. The source electrodes 11*a* and 11*c* of MNOS field effect transistors 10*a* and 10*c* are connected to a high gain noninverting differential 16*a* via line 28*a*. Differential amplifiers 16 and 16*a* are used in column read and refresh circuits 42 and 42*a* to read or refresh the volatile data in the cell 9 or 9*b* of column A and the cell 9*a* or 9*c* of column B. Switch 29 is used to switch from one row to another during read or refresh. As the input over lines 28 and 28*a* to the noninverting differential amplifier 16*a* and 16' is increased to −18 volts, the output on lines 19 and 19*a* of the differential amplifier 16 and 16*a* saturates at −18 volts. However, prior to an input signal being −18 volts, the noninverting differential amplifiers 16 and 16*a* amplify an input signal over lines 28 and 28*a*. Differential amplifiers 16 and 16*a* will not amplify below 1.2 volts due to the 1.2 volt reference voltage sources 41 and 41*a* connected thereto. A −18 volt row address circuit 31 is connected to the gate electrodes 7 and 7*a* or 7*b* and 7*c* of the MNOS field effect transistors 10 and 10*a* via switch 29 with switch 49 in the upper position. The row address circuit 31 can place −18 volts on the gate electrodes 7 and 7*a* or 7*b* and 7*c* of the MNOS field effect transistors shown to make the MNOS field effect transistors 10 and 10*a* or 10*b* and 10*c* conductive between their source electrodes and their drain electrodes. Power supply 50 supplies power to the row address circuit 31 through line 54.

A write data circuit 25 is connected to the source electrodes 11 and 11*b* of the MNOS field effect transistors 10 and 10*b* via lead 33. The write data circuit 25 has a −18 volt one bit write source 24 and a zero volt zero bit write source 27 therein. The one bit on zero bit write source 24 or 27 is selected by select switch 22. A one bit is selectively written into nonvolatile capacitive memory cell 9 by using row address circuit 31 and write data circuit 25 simultaneously. Only capacitor 12 is now charged to a one bit state. Nonvolatile capacitive memory cells 9*a*, 9*b* and 9*c* will continue to have a zero bit volatilely stored therein due to uncharged capacitors 12*a*, 12*b* and 12*c*. The write data circuit 25*a* is used to place a zero bit in nonvolatile capacitive memory cell 9*a* while the one bit is placed in nonvolatile capacitive memory cell 9.

The switch 29 is connected to the line 30 and the switch 49 is connected to the row address circuit 31 to read the information capacitively stored within nonvolatile capacitive memory cells 9 and 9*a*. The information is read from lines 43 and 43*a*. A one bit is read from line 43 as a −18 volt potential and a zero bit is read from line 43*a* as zero volt potential.

The data in nonvolatile capacitive memory cells 9 and 9*a* is then refreshed. Referesh switches 18 and 18*a* are closed to connect the output terminals 19 and 19*a* of the high gain noninverting amplifiers 16 and 16*a*, via output leads 32 and 32*a*, back to input leads 28 and 28*a* with switch 29 on line 30. The output of charged capacitor 12, but not that of uncharged capacitor 12*a*, is amplified by the high gain noninverting amplifier 16 and passed back to the source electrode 11 of the MNOS transistor 10 over lead 28, after closing refresh switches 18 and 18*a*, with switch 29 in contact with line 30. Capacitor 12*a* remains uncharging and unrefreshed. The negative output of the high gain noninverting amplifier 16 is applied to the plate 15 of capacitor 12 to restore the amount of charge which is volatilely held thereon to its full value. Clear switches 20 and 20*a* are then closed to remove any charge from input terminals 21 and 21*a* of the high gain noninverting amplifiers 16 and 16*a* after switch 29 is connected to ground. Clear switches 20 and 20*a* remove any charge which is stored on the source electrodes 11 and 11*a* of the MNOS transistors 10 and 10*a*, after switch 29 is connected to ground. This clearing is done after the capacitors 12 and 12*a* are selectively recharged. MNOS transistors 10 and 10*a* are then off. Clearing of the amplifiers 16 and 16*a* is done after the refreshing of the upper row of nonvolatile capacitive memory cells and before the reading of the lower row of nonvolatile capacitive memory cells 9*b* and 9*c* of the nonvolatile capacitive memory cell array 40 of FIG. 1. After nonvolatile capacitive memory cells 9*b* and 9*c* are read, by moving switch 29 to line 38, they are refreshed by closing switches 18 and 18*a* as described above. Switch 29 is then moved to the ground terminal and switches 20 and 20*a* to clear amplifiers 16 and 16*a*.

The write data circuits 25 and 25*a* have −18 volt one bit write sources 24 and 24*a* therein to write one bits successively in the upper or lower row of nonvolatile capacitive memory cells of FIG. 1. The data circuits 25 and 25*a* have zero bit write source 27 therein to alternatively write zero bits in the upper or lower rows of nonvolatile capacitive memory cells.

During a loss of power from power supply 50, a +30 volt preset circuit 35 is first connected via line 30 and then line 38 to the gate electrodes of the alterable threshold MNOS field effect transistors in the upper and then the lower rows of nonvolatile capacitive memory cells. A −30 volt storage circuit 37 is subsequently connected via line 30 and then line 38 to the gate electrodes of the alterable threshold field effect transistors. The preset circuit 35 is used to preset the threshold of the alterable threshold field effect transistors in the upper row and then the lower row of nonvolatile capacitive memory cells to −2 volts. Assuming that switch 29 is set to line 30, storage circuit 37 is then used to nonvolatilely write a one bit and zero bit of information respectively from the dielectric capacitors 12 and 12*a* into the alterable threshold MNOS field effect transistors 10 and 10*a* of nonvolatile capacitive memory cells 9 and 9*a* in the upper row of nonvolatile capacitive memory cells by means of channel shielding. Thus the volatile information of nonvolatile capacitive memory cells 9 and 9*a* is nonvolatilely stored therein during the loss of power thereto. The volatile information in the nonvolatile capacitive memory cells 9*b* and 9*c* is similarly nonvolatilely stored therein with switch 29 on line 38 by means of channel shielding.

Figure 2B:
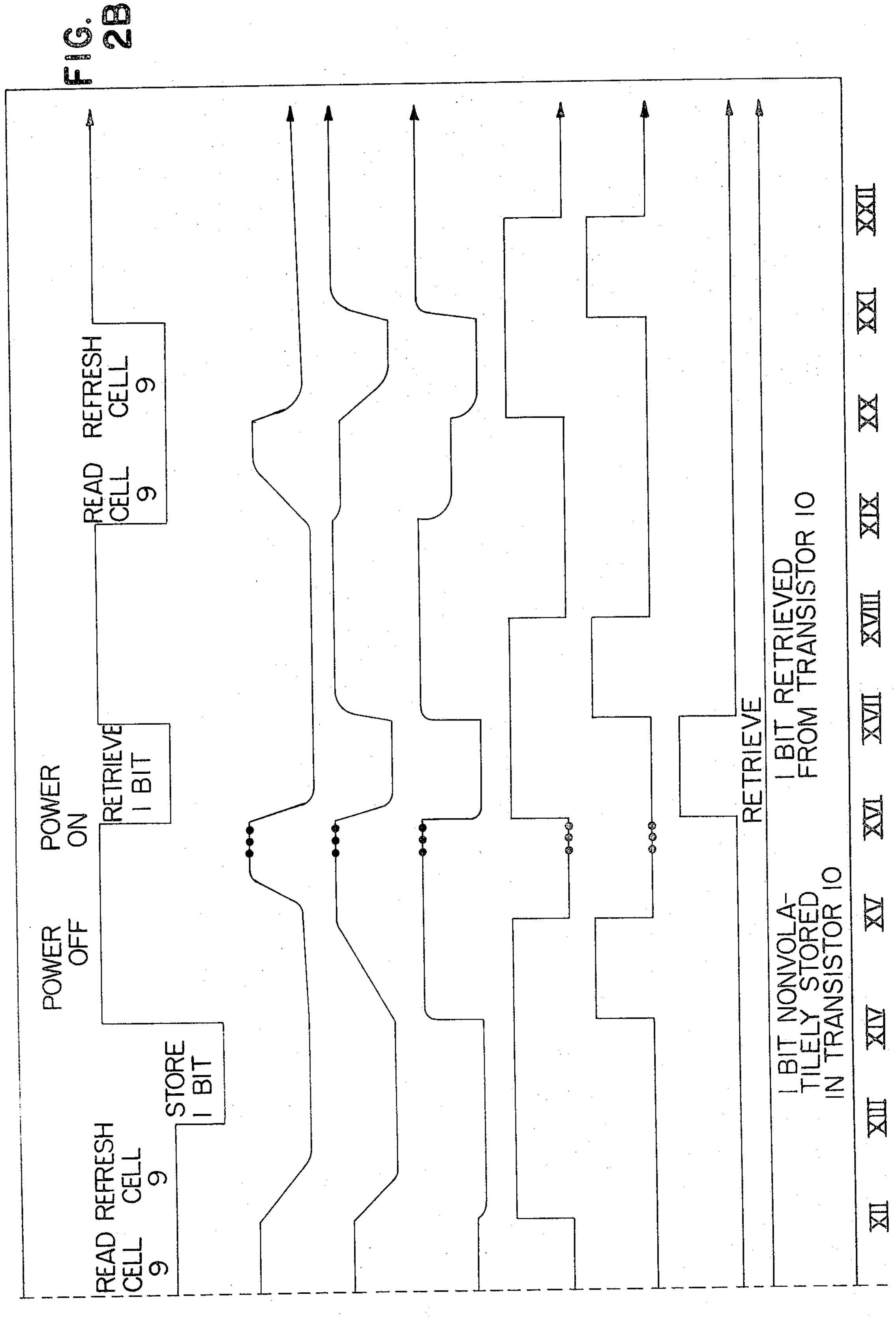

FIG. 2 is a timing diagram showing the read, refresh, preset, storage, and retrieve operations on the nonvolatile capacitive memory cell 9 of the nonvolatile capacitive memory cell array 40 of FIG. 1.

At time I a −18 volt gate voltage is applied, from row address circuit 31 through switches 49 and 29 to line 30, to make alterable threshold field effect transistor 10 conductive between its source and drain electrodes 11 and 13. The information is nonvolatile capacitive memory cell 9 is then read out on line 43.

At time II a one bit is written into nonvolatile capacitive memory cell 9 by applying −18 volts on the source electrodes 11 of the alterable threshold field effect transistor 10 via lead 28 by connecting write switch 22 to a one bit write source 24. At time II a −15 volt one bit is applied to the plate 15 of the capacitor 12 by the potential on line 14 due to a −3 volt threshold voltage of alterable threshold field effect transistor 10.

At time II, the input on lead 28 is also amplified by differential amplifier 16. The output of the differential amplifier 16 appears on output lead 32 but is not connected back to nonvolatile capacitive memory cell 9 since switch 18 is not closed. Similarly the input on lead 28*a* is amplified by differential amplifier 16*a*.

At time III the write switch 22 is opened and the clear switch 20 is closed. The clear switch 20 removes charge from the input terminal 21 to the differential amplifier 16 and from the source electrode 11 of the alterable threshold field effect transistor 10. The charge on the output terminal 19 of the differential amplifier 16 is also removed at this time. However, charge remains on the drain electrode 13 of the alterable threshold field effect transistor 10 and also on the lead 14 and plate 15 of the capacitor 12, since the gate electrode 70 of the alterable threshold field transistor 10 has no gate voltage thereon.

At time IV the refresh switch 18 and the clear switch 20 are both opened.

During time V to VII the nonvolatile capacitive memory cell 9 which has a one bit of information capacitively stored therein is read out on line 43 and then refreshed. The −15 volts one bit which is on the plate 15 of dielectric capacitor 12 tends to leak off with time. To restore this charge to a −15 volt level a read and refresh operation is performed. This read and refresh operation is repeated on the nonvolatile capacitive memory cell 9 every 100 microseconds. A −18 volt address signal from row address circuit 31 is applied to line 50 at time V to turn on the alterable threshold field effect transistor 10. The output of the capacitor 12 is then amplified by the differential amplifier 16 to read the binary state of the capacitor 12 on line 43. The refresh switch 18 is then closed, at time VI, to feed the amplified output from the amplifier 16 back on to the source electrode 11 and then to drain electrode 13 of the alterable threshold field effect transistor 12 to refresh the binary data in capacitor 12. The level of charge on the plate 15 is brought back to approximately −15 volts. At time VII the voltage on line 30 is removed, to turn off the alterable threshold MNOS transistor 10. The clear switch 20 is then closed to remove charge from the source electrode 11 and input 21 of the differential amplifier 16, and from the output lead 32 of the differential amplifier 16. At time VIII the clear switch 20 and the refresh switch 18 are both opened.

At time IX, a plus 30 volt preset signal is applied to line 30 from preset circuit 35. At this time −15 volts is one line 14 and drain electrode 13. Zero volts is on source electrode 11 of alterable threshold field effect transistor 10. The +30 volts draws electrons into the space between the silicon nitride layer 8 and silicon oxide layer 6 of the alterable threshold MNOS field effect transistor 10, and causes the threshold voltage of alterable threshold MNOS transistor 10 to be raised to −2 volts from a −3 volt threshold voltage. Thus the nonvolatile capacitive memory cell 9 is preset to a one state. The +30 volts signal on line 30 is removed at time X.

At times XI through XIII the volatile information within the nonvolatile capacitive memory cell 9 is read out on line 43 and then refreshed. Then at times XIII to XIV this volatile information in the dielectric capacitor 12 is nonvolatilely stored into the alterable threshold MNOS field effect transistor 10.

The information is read and refreshed between times XI and XIII by applying a −18 volt address voltage on line 30. Between times XI and XII the voltage on lead 28, which is the voltage on the source electrode 11, is amplified by differential amplifier 16 and passed onto lead 43 to read the one bit in the nonvolatile capacitive memory cell 9. At time XII refresh switch 18 is closed to cause the output on lead 32 to refresh capacitor 12. Thus the voltage on plate 15 is brought back to −15 volts. Just after time XII −15 volts exists on drain electrode 13 of the alterable threshold MNOS transistor 10. Thus, a channel shielding voltage exists on the drain electrode 13 of alterable threshold field effect transistor 10 at time XIII.

At time XIII, a −30 volt store pulse is applied from store circuit 37 to alterable threshold MNOS field effect transistor 10. The threshold voltage of the alterable threshold MNOS field effect transistor 10 remains at −2 volts since a −15 volt channel shielding voltage from dielectric capacitor 12 exists on drain electrode 13. This is due to the fact that only a 15 volt differential voltage exists between the gate electrode 7 and the drain electrode 13 of the alterable threshold field effect transistor. This is not enough voltage to drive electrons which are at the interface of the silicon oxide layer 6 and silicon nitride layer 8 back downward through the silicon oxide layer 6 to change the threshold voltage of the alterable threshold MNOS field effect transistor 10. The alterable threshold field effect transistor 10 thus remains at a −2 volt threshold due to channel shielding on its drain electrode 13. A one bit of information which was in the dielectric capacitor 12 and which corresponds to a −2 volt threshold voltage is thus nonvolatilely written into the alterable threshold MNOS field effect transistor 10 as a −2 volt threshold voltage.

It should be noted that if a zero volt zero bit existed on plate 15 of dielectric capacitor 12 at time XIII, a zero bit would have nonvolatilely stored in the alterable threshold MNOS field effect transistor 10 as a −8 volt threshold voltage. This is due to the fact that the drain electrode 13 would have had zero volts thereon. Thus no channel shielding voltage would have existed on the drain electrode 13 at time XIII. When the −30 volt set voltage is applied between the gate electrode 7 and the drain electrode 13 of the alterable threshold field effect transistor 10, the 30 volt difference across the dual insulator layers 6 and 5 of the MNOS field effect transistor 10 would be sufficient to drive electrons, pre-stored within the interface between the silicon nitride layer 8 and the silicon oxide layer 6, through the silicon oxide layer 6 to change the threshold voltage of the alterable threshold field effect transistor 10 from a preset −2 volts to approximately −8 volts. However, this does not occur in nonvolatile capacitive memory cell 9 due to the fact that a −15 volt one bit is volatilely stored on plate 15 of dielectric capacitor 12 at time XIII of FIG. 2.

At time XIV, the clear switch 20 is closed to remove charge from the source electrode 11 and from the input 21 of the high gain differential amplifier 16. This charge is also removed from the output lead 32. Thereafter, at time XV, the clear switch 20 is again opened. At this time, power may be completely lost or removed from the nonvolatile capacitive memory cell 9. The one bit of information nonvolatilely stored within the nonvolatile capacitive memory cell 9 of FIG. 1 nonvolatilely remains therein. This one bit will hold for several months within the nonvolatile capacitive memory cell 9 without power being applied to said nonvolatile capacitive memory cell 9. A power supply sense circuit 59 senses the loss of power from power supply 50 to activate the preset and store sequence made by switch 49.

The advantage of the nonvolatile capacitive memory cell 9 of FIG. 1 is that the information within said memory cell 9 is not lost during loss of power thereto, as is true of a volatile capacitive memory cell. In a volatile memory cell, if power is lost therefrom, the charge upon a plate 15 will soon leak off and the information will be completely lost. In the nonvolatile capacitive memory cell 9 of FIG. 1, it is seen that even though the charge on plate 15 of the volatile capacitor 12 leaks off after the loss of power, the information which has been nonvolatilely stored in the alterable threshold field effect transistor 10 remains. The information may be retrieved when power is reapplied to nonvolatile capacitive memory cell 9.

Shortly before XVI, power is reapplied to the nonvolatile capacitive memory circuit 9. At time XVI −18 volts is applied to line 30 from row address circuit 31 and to line 28 from one bit write source 24. Since the threshold voltage of the alterable threshold MNOS field effect transistor 10 is at −2 volts, the capacitor 12 is charged to −16 volts. A one bit is rewritten back into the capacitor 12 since the one bit has been nonvolatilely written into the alterable threshold MNOS field effect transistor 10 as a −2 volt threshold voltage. The charge in the capacitor 12 is redistributed at time XVI along the line 28 to cause the redistributed charge to present a −1.6 volts at the intput terminal 21 of differential amplifier 16. The 1.6 volts is amplified to replace −16 volts on dielectric capacitor 12.

Had a zero bit been written into the alterable threshold MNOS field effect transistor 10 as a −8 volt threshold voltage, only −10 volts would be placed on the plate 15 of the volatile capacitor 12 from one bit write source 24 at time XVI. The high gain amplifier 16 will not amplify a signal less than a 1.2 volt reference voltage. A redistributed charge of −10 volts on plate 15 of the capacitor 12 when spread over lead 28 would become 1.0 volts at input terminal 21 of differential amplifier 16.

The amplifier 16 would not amplify the 1.0 volt signal from capacitor 12. No voltage would be reapplied to dielectric capacitor 12 from differential amplifier 16. The amplifier 16 would not amplify the 1.0 volt signal from capacitor 12. No voltage would be reapplied to dielectric capacitor 12 from differential amplifier 16. The −10 volt zero bit would soon leak off capacitor 12. Thus a zero bit would be retrieved into dielectric capacitor 12.

However, since a potential of −16 volts exists on the plate 15 of the capacitor 12 at time XVI, the −16 volt signal which is on the plate 15 of capacitor 12 is refreshed by amplifier 16. A −16 volt one bit is thus rewritten into dielectric capacitor 12. The write switch 22 was closed at time XVI to cause the −16 volts to be applied to the plate 15 of capacitor 12. Write switch 22 is opened at time XVII and clear switch 20 is closed at time XVII to remove the charge from the source electrode 11 of the alterable threshold MNOS field effect transistor 10 and from the output line 32 of the amplifier 16.

The refresh switch 18 and clear switch 20 are opened at time XVIII. At time XIX, since a potential of −16 volts is on plate 15 of capacitor 12, a one bit is read out on line 43 when −18 volts is placed on line 30 from row address circuit 31. At time XX the refresh switch is closed to refresh the one bit volatilely stored in capacitor 12. At time XXI the −18 volts on line 30 is removed and the clear switch 20 is closed to remove charge from the source electrode 11 of the alterable threshold MNOS field effect transistor 10. The one bit remains volatilely stored in nonvolatile capacitive memory cell 9 at time XXI. After time XXII the nonvolatile capacitive memory cell 9 may be operated in the read and write or read and refresh mode. That is, normal reading, writing and refreshing may be carried out on the nonvolatile capacitive memory cell 9 of FIG. 1.

The nonvolatile capacitive memory cells of the array 40 of FIG. 2 can be used as read-only memory cells or as read/write access memory cells. It takes approximately one microsecond to volatilely write a nonvolatile capacitive memory cell. It takes approximately 1 millisecond to nonvolatilely write a nonvolatile capacitive memory cell. Information may be randomly volatilely written into the nonvolatile capacitive memory cells of the array 40 of FIG. 3. Information within any cell may be read quickly, as shown between times XVI and XXII of FIG. 2. The array 40 of FIG. 3 will provide a fast readout of information which is nonvolatilely stored therein for long periods of time, such as months to years, due to the fact that the value of the threshold voltage of each alterable threshold field effect transistor is used to recharge its corresponding dielectric capacitor to one of two values.

Figure 4:
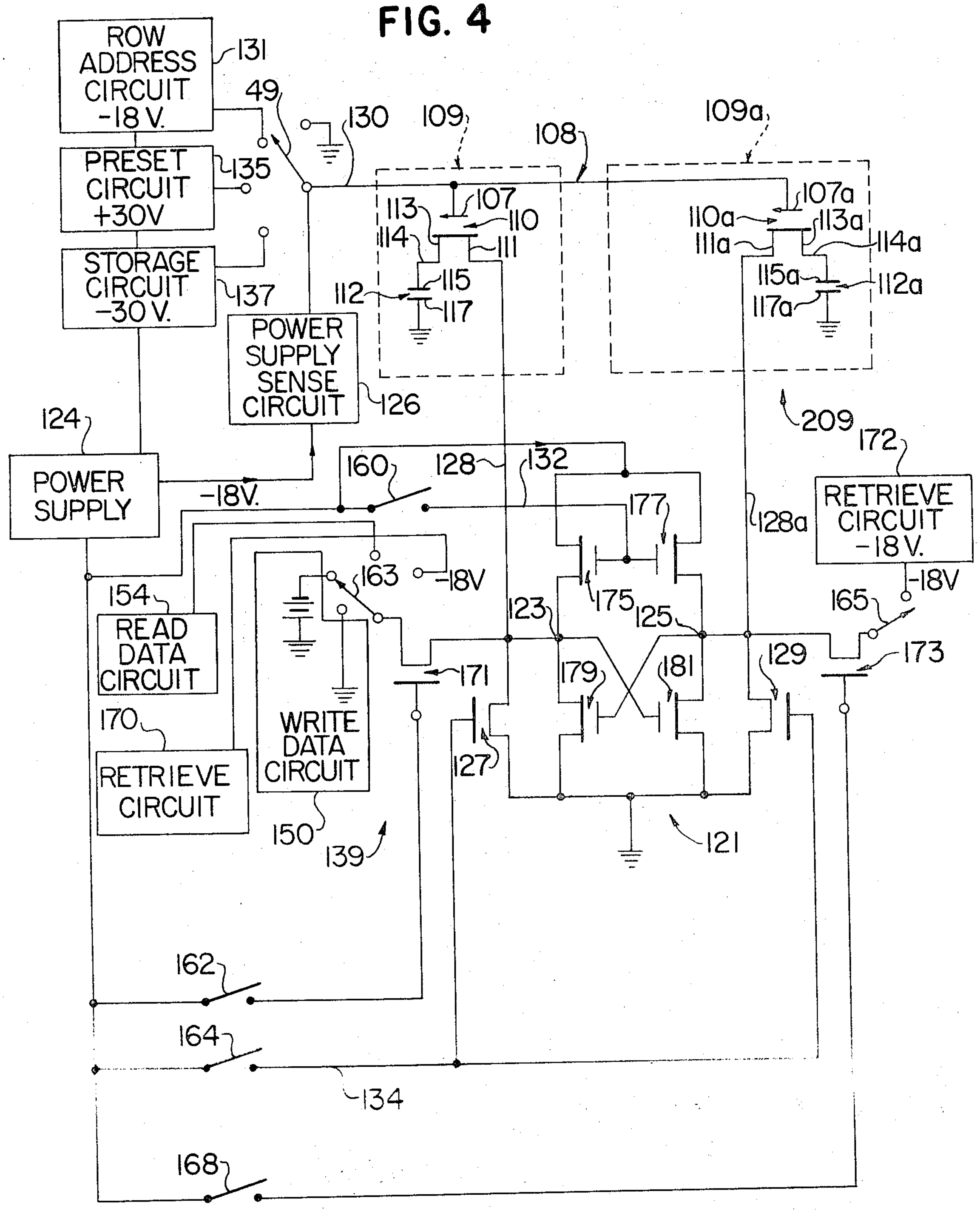
FIG. 4 is a schematic circuit diagram of a dual combination of nonvolatile capacitive memory cells for holding a single binary bit of information therein.

FIG. 4 is a modification of the circuit of FIG. 1, and shows a circuit 139 for a duel combination 108 of capacitive memory cells 109 and 109*a* as shown in FIG. 1. The duel combination 108 stores a single bit of information therein. The nonvolatile capacitive memory cell 109 and the nonvolatile capacitive memory cell 109*a* are used in a differential mode. A bit of information is stored using the two nonvolatile capacitive memory cells 109 and 109*a* in a differential mode in FIG. 4, rather than only one nonvolatile capacitive memory cell 109 and 109*a*. One of the two capacitors 112 and 112*a* is charged by means of a write data circuit 150 to respectively volatilely store a one or zero binary bit of information therein.

Flip-flop 121 is set to a one state by write data circuit 150 by closing switch 162 with switch 163 set to the −18 volt potential, and then closing switch 160. The voltage on terminal 123 is −15 volts due to a 3 volt drop across load transistor 175. Since the terminal 123 is at −15 volts the gate electrode of the MOS transistor 181 is also charged. The flip-flop 121 is said to be in the one state since terminal 123 is held to −18 volts and terminal 125 is held at ground potential when switch 160 is closed.

Setting of the volatile flip-flop 121 to one of its two stable states allows for the subsequent storage of the bit of information in flip-flop circuit 121 into nonvolatile capacitive memory cells 109 and 109*a*. In the present example, since terminal 123 is at −15 volts when a potential of −18 volts is placed on line 130 to make variable threshold transistors 110 and 110*a* conductive, capacitor 112 is charged to −15 volts. The capacitor 112*a* is not charged since terminal 125 is at ground potential. The −18 volts is then removed from line 130 leaving capacitor 112 charged. At this time the flip-flop 121 may have its information removed by closing switch 164 and opening switch 160. Terminals 123 and 125 are both grounded when switch 164 is closed to remove the flip-flop 121 from a bistable state.

The charge in the nonvolatile capacitive memory cell 109 may be refreshed by the flip-flop circuit 121. The flip-flop circuit 121 is first reset from the two nonvolatile capacitive memory cells 109 and 109*a* by making line 130 negative just before the time that switch 160 is closed, but after switch 164 is opened. The flip-flop 121 is reset and recharges capacitor 112 when switch 160 is closed and after switch 164 is opened. Line 130 is grounded after the dual combination 108 is refreshed.

During readout, the flip-flop 121 is used to sense the relative charge in the two nonvolatile capacitive memory cells 109 and 109*a*. Line 130 is made negative and switch 160 is closed to set the flip-flop 121 to the state of the dual combination 108 of nonvolatile capacitive cells 109 and 109*a*. Since a charge exists in the capacitor 112 the MOS transistor 181 is turned on, to ground terminal 124. Since terminal 125 is grounded, MOS transistor 179 remains off. Therefore terminal 123 is brought to −15 volts by closing switch 160. Switch 160 is then opened.

Switch 163 is then set to the read data circuit 154 to sense the state of the flip-flop 121 by sensing the voltage at terminal 123. Switch 162 is closed and the voltage of the terminal 123 is sensed to determine whether a zero or one bit is held in flip-flop circuit 121. Switch 162 is then opened.

During a loss of power to the dual combination 110 of nonvolatile capacitive memory cells 109 and 109*a*, the charge which is in either capacitor 112 or capacitor 112*a* is first sensed by flip-flop circuit 121. Switch 164 is closed and opened and then switch 49 is placed in contact with −18 volt address circuit 131. Switch 160 is then closed to set flip-flop circuit 121 to the state of the dual combination 108 of nonvolatile capacitive memory cells 109 and 109*a*. Nonvolatile capacitive memory cells 109 and 109*a* are therefore refreshed. Line 130 is then made +30 volts by placing switch 49 in contact with +30 volt preset circuit 135 to preset the threshold voltage of transistors 110 and 110*a* to −2 volts. The line 130 is then made −30 volts by placing switch 49 in contact with −30 volt storage circuit 137. Due to the state of the flip-flop 121 and the charge on the capacitor 112, channel shielding exists on the source and drain electrodes of alterable threshold MNOS field effect transistor 110 to prevent the decrease in the threshold voltage of transistor 110. In the present example, since a +15 volts exists on terminal 123 and a −15 volt charge exists on capacitor 112, when line 130 is at −30 volts negative, the threshold voltage of transistor 110 does not decrease. However, since terminal 125 is at ground potential and capacitor 112*a* is uncharged, the −30 volt voltage placed on line 130 causes electrons to be driven from between the insulator layers of the MNOS transistor 110*a* to decrease its threshold voltage from approximately −2 volts to approximately −8 volts. Thus during the loss of power to the dual combination 108 of nonvolatile capacitive memory cells 109 and 109*a*, the state of the dual combination 110 of cells 109 and 109*a* is nonvolatilely stored in variable threshold MNOS field effect transistors 110 and 110*a*.

After power supply 124 is again supplying power, the information nonvolatilely stored in the alterable threshold MNOS field effect transistors 110 and 110*a* of nonvolatile capacitive memory cells 109 and 109*a* is retrieved and placed back into the dielectric capacitors 112 and 112*a*. A potential of −18 volts is applied to lines 128 and 128*a* from retrieve circuits 170 and 172 respectively by closing switches 162 and 168, with switches 163 and 165 set to the restore circuits 170 and 172. A potential of −18 volts is applied to the gate electrodes 107 and 107*a* of the nonvolatile field effect transistors 110 and 110*a* through line 130 by setting switch 49 to the row address circuit 131. Since nonvolatile variable threshold MNOS field effect transistor 110 has a threshold voltage of −2 volts, the capacitor 112 will be charged to −16 volts. Since the variable threshold MNOS field effect transistor 110a has a threshold voltage of −8 volts, the −18 volts on the source electrode 111a of transistor 110a will charge capacitor 112a to −10 volts. Since the voltage on capacitor 112 is now more negative than the voltage on capacitor 112a, when a set voltage is applied to line 132 by closing switch 160 and then an address voltage is again applied to line 130 from the row address circuit 131, the flip-flop circuit 121 is set to the one binary state. Since the redistribution over line 128 of the charge of capacitor 112 causes the voltage on line 128 to be 10 percent of the initial voltage, than the voltage on terminal 123 from charge capacitor 112 would be 1.6 volt. Since the voltage on capacitor 112a was −10 volts, the redistribution over line 128a of the charge of capacitor 112a causes the voltage on line 128a to be 10 percent of the initial voltage, the voltage on terminal 125 from charged capacitor 112a would be 1.0 volts. When a set voltage is applied to line 132, and since the voltage drop across both transistors 175 and 177 is −3 volts, transistor 181 will turn on before transistor 179. Therefore the terminal 125 will go to ground potential and terminal 123 will go to −15 volts. Thus information has been properly transferred from the nonvolatile capacitor memory cells 109 and 109a to the flip-flop 121. The voltage on the dielectric capacitors 112 and 112a are set to the voltages on terminals 123 and 125 respectively. Thus a one bit has been transferred back to dual combination 108 after power is restored to circuit 139.

After the nonvolatile information has been read from the alterable threshold voltage transistor 110 and 110a, the threshold voltages of alterable threshold voltage transistors 110 and 110a are returned to −2 volts by pulsing line 130 with a potential of +30 volts. Then electrons are drawn between the silicon nitride and silicon oxide insulator layers of transistor 110a to change its threshold from −8 volts to −2 volts. Since the threshold voltage of alterable threshold voltage transistor 110 is at −2 volts, its threshold voltage stays at that level. Therefore the information which was nonvolatilely stored in the alterable threshold field effect transistors 110 and 110a during a loss of power to the nonvolatile capacitive memory cells 109 and 109a of FIG. 4 is transferred back into the dielectric capacitors 112 and 112a of the nonvolatile capacitive memory cells 109 and 109a after power is restored.

Figure 5:
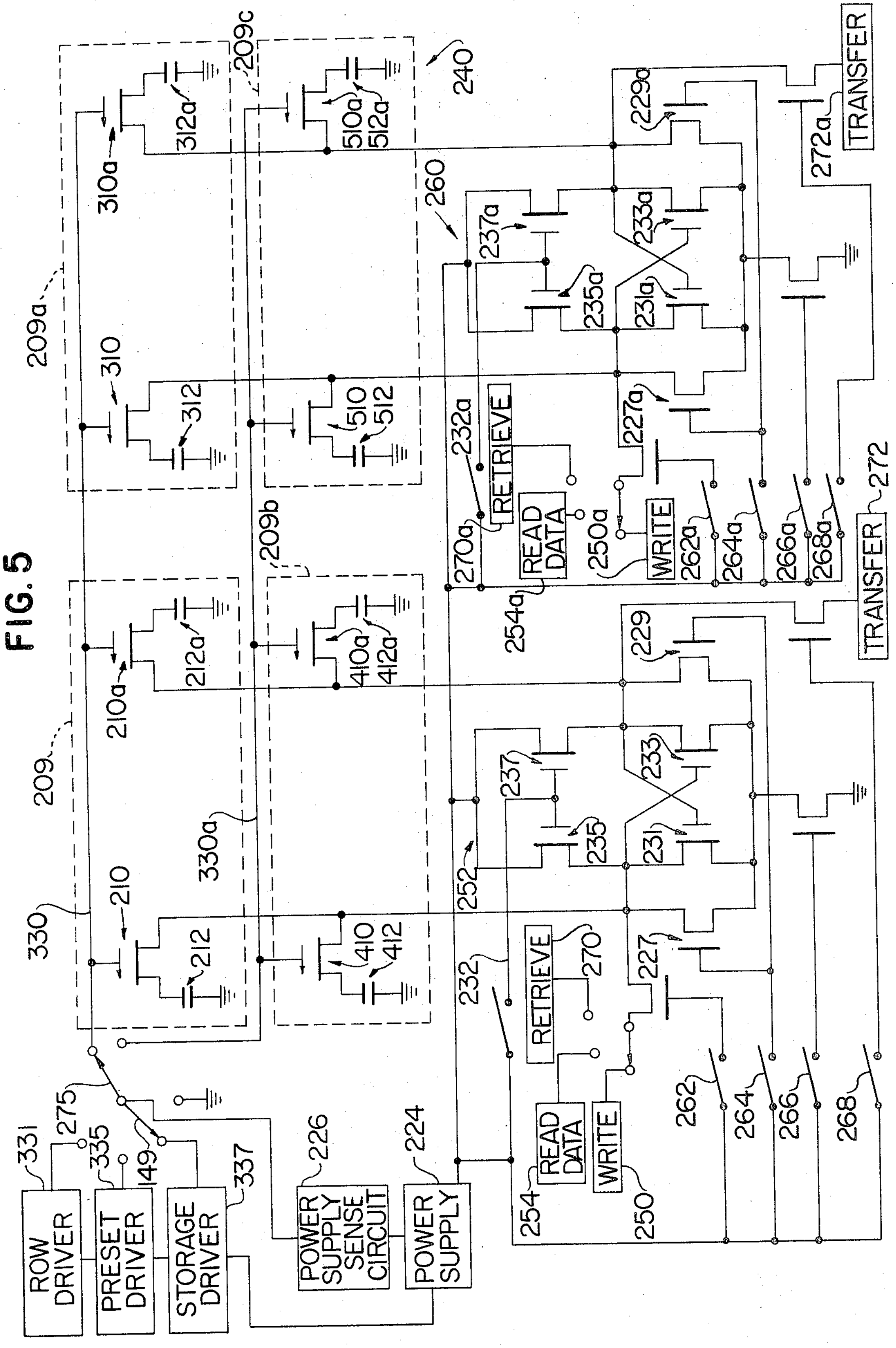
FIG. 5 is a schematic circuit diagram of an array of dual combinations of nonvolatile capacitive memory cells.

FIG. 5 shows an array 240 of the nonvolatile capacitive cell pairs 209, 209a, 209b and 209c, such as shown in FIG. 4. Each nonvolatile capacitive cell pair has two nonvolatile capacitive memory cells, such as 210 and 210a, to store one bit of binary information therein. In the array of FIG. 5, four binary bits of information may be nonvolatilely stored during a loss of power to the nonvolatile capacitive memory cell pair array 240. Flip-flops 252 and 260 are used to read, volatilely write and retrieve information for the nonvolatile capacitive memory cell pairs in the two columns of the array 240. Flip-flop 252 writes into the nonvolatile capacitive memory cell pairs 209 and 209b in the left hand column. Flip-flop 260 writes into the nonvolatile capacitive memory cell pairs in the right hand column. The switch 275 is used to select the line 330 or the line 330a, in order to select a row of nonvolatile capacitive memory cell pairs. The row including nonvolatile capacitive memory cell pairs 209 and 209a may be selected, or the row including nonvolatile capacitive memory cell pairs 209b and 209c may be selected, by switch 275.

Since the left hand column may be accessed at the same time that the top row of nonvolatile capacitive memory cell pairs is accessed, information may be written into the cell pair 209. By means of cross-energization, any of the four cells pairs in array 240 may be written into. However, in the present embodiment, information is written into all of the nonvolatile capacitive memory cell pairs of a row, one row at a time.

Information is refreshed one row at a time within the array of nonvolatile capacitive memory cell pairs in array 240. The flip-flop in each column senses the volatile information of the nonvolatile capacitive memory cell connected thereto, during the addressing of the nonvolatile memory cell pairs in the given row of the array 240. Thus nonvolatile capacitive memory cell pairs 209 and 209a are refreshed at a certain time. Thereafter, the nonvolatile capacitive memory cell pairs 209b and 209c are refreshed.

The information in the array 240 is nonvolatilely stored during a loss of power thereto, one row at a time. Thus, a flip-flop connected to each cell in a given row is set and information is that row is nonvolatilely stored. Then by changing switch 275 the information volatilely stored in the next row is also nonvolatilely stored during the loss of power.

After power has been reestablished to the nonvolatile capacitive memory cell array 240, the information nonvolatilely stored in the array 240 is written back into nonvolatile field capacitive memory cell pairs of that row as described in the circuit of FIG. 4. A nonvolatile one bit is retrieved from the alterable threshold MNOS transistors 210 and 210a. The retrieved one bit is placed in the capacitors 212 and 212a as a charge on the capacitor 212.

Figure 6:
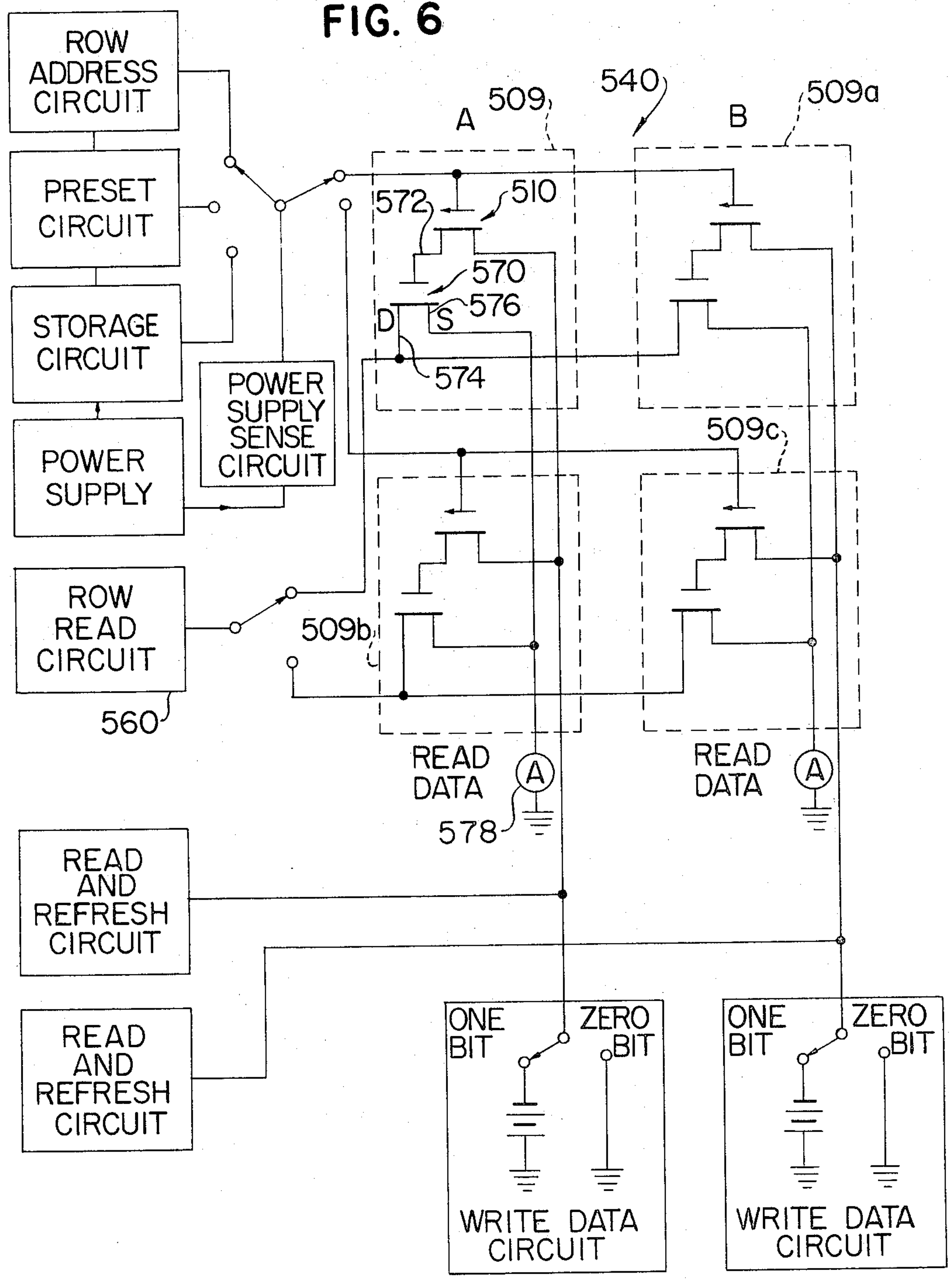
FIG. 6 is a schematic diagram of a nonvolatile capacitive memory cell comprising a fixed threshold field effect transistor and an alterable threshold field effect transistor.

FIG. 6 shows a nonvolatile capacitive memory cell array 540 which is a modification of the memory circuit of FIG. 1. The array 540 has four nonvolatile capacitive memory cells 509, 509a, 509b and 509c therein. The nonvolatile capacitive memory cell 509 has a nonvolatile MNOS field effect transistor 510 and volatile MOS field effect transistor 570 therein. Charge is volatilely stored on the gate electrode 572 of the MOS field effect transistor 570 to store a binary bit in the nonvolatile capacitive memory cell 509. If a charge is stored on the gate electrode 572 of the volatile MOS field effect transistor 570 when a read voltage from a row read circuit 560 is applied to the drain electrode 574 of the MOS field effect transistor 570, a current will flow from the drain electrode 574 of the MOS field effect transistor 570, a current will flow from the drain electrode 574 to the source electrode 576. The current will flow through the ammeter 578 to indicate the storage of a one bit in the nonvolatile capacitive memory cell 509. This method isused to read data out of the nonvolatile capacitive memory cell 509.

The circuit of FIG. 6 is smaller in function to the circuit of FIG. 1. The refresh operations in the two circuits are the same. The circuit of FIG. 6 is also similar to the circuit of FIG. 1 in the write data in function. Further, the circuit of FIG. 6 is similar to the circuit of FIG. 1 in the row address function, the preset function and the storage function. In fact the only difference between the circuit of FIG. 6 and the circuit of FIG. 1 are the procedures by which the data is read out. When a voltatile MOS field effect transistor rather than a volatile capacitor is used in a nonvolatile capacitive memory cell, the amount of current which will pass through the volatile MOS field effect transistor, rather than the amount of charge stored in the volatile capacitor can be used to read data out of the nonvolatile capacitive memory cell 509.

Thus, it is seen that the present invention contemplates capacitive storage both in a capacitor or between the gate and substrate of a MOS field effect transistor. Variations of the nonvolatile capacitive memory cell circuits described above will become evident to one skilled in the art.

What is claimed is:

1. A nonvolatile capacitive memory cell for storing binary information therein, comprising:

a. an alterable threshold field effect transistor capable of storing a charge in a nonvolatile manner, and having source and drain regions and a gate electrode comprising a layer of a first dielectric material disposed on a layer of a second dielectric material and forming an interface therebetween for storing information therein;

b. capacitive means for storing information therein; and c. circuit means connecting the capacitive means to the drain region for transferring the information from the capacitive means to the interface of the dielectric layers for storage therein at power down.

2. The nonvolatile capacitive memory cell of claim 1 and including refresh circuit means connectable to the gate electrode and source region for refreshing the the information in the capacitive means.

3. The nonvolatile capacitive memory cell of claim 2 wherein the refresh circuit means includes a differential amplifier and a switch connected in parallel with the amplifier.

4. The nonvolatile capacitive memory cell of claim 2 and including preset circuit means for presetting the alterable threshold field effect transistor prior to nonvolatilely storing the volatile information of the capacitive means in the interface of the gate electrode.

5. A nonvolatile capacitive memory cell for storing binary information therein comprising:

a. semiconductor wafer;

b. an alterable threshold field effect transistor, for nonvolatilely storing charge therein, built in the semiconductor wafer, the transistor having a source region, a drain region and a channel region, a source electrode and a drain electrode affixed to the source region and drain region respectively, an insulator layer structure comprising a layer of a first dielectric material disposed on the channel region, a layer of a second dielectric material disposed on the first layer and forming an interface which can nonvolatilely store information therein, a gate electrode to the second layer of the insulator layer structure;

c. a capacitive means for storing information therein, having a first electrode comprising the conductive material of the wafer, a layer of a dielectric material disposed on, and in contact with, the first electrode, and a second electrode affixed to the layer of dielectric material; and d. a contact lead having one end in contact with the drain electrode of the alterable threshold field effect transistor and the other end in contact with the second electrode of the capacitive means to transfer the information capacitively stored in the capacitor means into the interface of the insulator layer structure of the alterable threshold field effect transistor at power down.

6. A nonvolatile capacitive memory cell circuit for storing binary information therein, comprising:

a. alterable threshold field effect tranistor, for nonvolatilely storing information therein, built in a semiconductor substrate which has a source region and a drain region in the semiconductor substrate with a channel region therebetween, a source electrode and a drain electrode in contact with the source region and drain region respectively, an insulator layer structure which can nonvolatilely hold information therein in contact with said channel region, and a gate electrode in contact with said insulator layer structure;

b. a capacitive means for capacitively storing information therein, having a first electrode comprising conductive material of the substrate, a layer of a dielectric material disposed on and, in contact with said first electrode, and a second electrode disposed on and in contact with the layer of dielectric material;

c. a contact lead having one end in contact with said drain electrode of said alterable threshold field effect transistor and the other end in contact with the second electrode of said dielectric capacitor to transfer information capacitively stored in the capacitive means into the alterable threshold field effect transistor at power down; and d. a storage circuit means connectable to the gate electrode of the alterable threshold field effect transistor for causing the nonvolatilely storing any capacitively stored information of the capacitive means in the alterable threshold field effect transistor via the contact lead.

7. The nonvolatile capacitive memory cell circuit of claim 6 and further including refresh circuit means connectable to the source electrode of the alterable threshold field effect transistor for refreshing the information stored in said capacitive means.

8. The nonvolatile capacitive memory cell circuit of claim 7 wherein the refresh circuit means includes a differential amplifier and a switch connected in parallel with the amplifier.

9. The nonvolatile capacitive memory cell circuit of claim 7, also including a preset circuit means connectable to the gate electrode of the alterable threshold field effect transistor for presetting the threshold voltage of the alterable threshold field effect transistor.

10. An array of nonvolatile capacitive memory cells for storing several binary bits of binary information therein, comprising:

a. a plurality of address lines;

b. a plurality of read, write and refresh lines;

c. a plurality of groups of alterable threshold field effect transistors built in a semiconductor substrate, each alterable threshold field effect transistor having a source region, a drain region and a channel region therebetween, a source electrode and a drain electrode in contact with the source region and drain region respectively, an insulator layer structure disposed on and in contact with said channel region, and comprising a first layer of a first dielectric material disposed on the channel region and a second layer of a second dielectric material disposed on the first layer and forming an interface between the two layers suitable for storage of information therein and a gate electrode in contact with said insulator layer structure, each transistor in each group of transistors has its gate electrode connected to its respective address line and its source electrode connected to its own different one of the plurality of read, write and refresh line;

d. a plurality of capacitive means to capacitively store several bits of information therein, each capacitive means have a first electrode comprising conductive material of the substrate, a layer of a dielectric disposed on and in contact with said first conductive material, and a second electrode disposed on and in contact with the layer of dielectric material; and e. a plurality of contact leads, each contact lead having one end in contact with a drain electrode of an alterable threshold field effect transistor and the other end in contact with the first electrode of a capacitive means to form a nonvolatile memory cell for nonvolatile storage of information which is transferred to the connected alterable threshold field effect transistor at power down.

11. The array of nonvolatile capacitive memory cells of claim 10, also including a refresh circuit means connected to each of the plurality of transistors for refreshing the information in each memory cell.

12. The array of nonvolatile capacitive memory cells of claim 11 wherein:

the refresh circuit means includes a differential amplifier and a switch connected in parallel with the amplifier connected into each of the plurality of read, write and refresh lines.

* * * * *